US012286853B2

United States Patent
Knizhnik et al.

(10) Patent No.: US 12,286,853 B2
(45) Date of Patent: Apr. 29, 2025

(54) INSTRUMENTED SUB

(71) Applicant: Nabors Drilling Technologies USA, Inc., Houston, TX (US)

(72) Inventors: Sergei Knizhnik, Exton, PA (US); Scott Boone, Houston, TX (US); Christopher Conrad, Glen Mills, PA (US); Maciej Panek, West Chester, PA (US); Edward J. Harris, III, Pottstown, PA (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 90 days.

(21) Appl. No.: 18/366,833

(22) Filed: Aug. 8, 2023

(65) Prior Publication Data

US 2024/0052704 A1    Feb. 15, 2024

Related U.S. Application Data

(60) Provisional application No. 63/370,839, filed on Aug. 9, 2022.

(51) Int. Cl.
*E21B 3/02* (2006.01)
*E21B 21/01* (2006.01)
(Continued)

(52) U.S. Cl.
CPC .............. *E21B 3/022* (2020.05); *E21B 21/01* (2013.01); *G01L 3/108* (2013.01); *G01P 3/44* (2013.01)

(58) Field of Classification Search
CPC . G01P 3/481; G01P 3/44; G01L 3/104; G01L 3/108; E21B 33/085; E21B 21/01; E21B 3/022
See application file for complete search history.

(56) References Cited

U.S. PATENT DOCUMENTS

| 4,339,108 A | 7/1982 | Daniluk |
| 4,700,924 A | 10/1987 | Nelson et al. |

(Continued)

FOREIGN PATENT DOCUMENTS

| CA | 2542964 C | 10/2011 |
| EP | 2518259 B1 | 8/2014 |

(Continued)

OTHER PUBLICATIONS

3PS, Inc., "Wireless Drilling Torque & Tension", sales@3PSinc. com, published 2011.

*Primary Examiner* — Yong-Suk (Philip) Ro
(74) *Attorney, Agent, or Firm* — Abel Schillinger, LLP

(57) ABSTRACT

A system including an instrumented sub for supporting subterranean operations, the instrumented sub can include an upper and lower portion with a flow passage extending therethrough, and a valve that selectively permits or restricts fluid flow through the flow passage, and a rotary interface coupled to the upper portion and including a rotary portion and a stationary portion, where the rotary portion is rotationally fixed to the upper portion and rotates with the upper portion, where the stationary portion is rotationally coupled to the rotary portion, and where the rotary interface transfers communication signals between the stationary portion and the rotary portion to transmit commands or data to or receive the commands or data from one or more components of the instrumented sub. Can also include a method of using the instrumented sub to determine a vertical position or movement of a top drive.

20 Claims, 12 Drawing Sheets

(51) Int. Cl.
 *G01L 3/10* (2006.01)
 *G01P 3/44* (2006.01)

(56) References Cited

U.S. PATENT DOCUMENTS

| | | | |
|---|---|---|---|
| 5,246,203 | A | 9/1993 | McKnight et al. |
| 5,507,467 | A | 4/1996 | Mott |
| 5,979,865 | A | 11/1999 | Rabby |
| 6,429,787 | B1 | 8/2002 | Pyne |
| 6,840,493 | B2 * | 1/2005 | York ............... F16K 31/122 |
| | | | 251/250 |
| 7,108,081 | B2 | 9/2006 | Boyadjieff |
| 7,757,759 | B2 | 7/2010 | Jahn et al. |
| 8,544,564 | B2 | 10/2013 | Moore et al. |
| 8,631,882 | B1 | 1/2014 | Keast |
| 8,648,733 | B2 | 2/2014 | Dopf et al. |
| 8,651,175 | B2 | 2/2014 | Fallen |
| 9,133,668 | B2 | 9/2015 | Cardellini et al. |
| 9,546,545 | B2 | 1/2017 | Cardellini et al. |
| 9,581,010 | B2 | 2/2017 | Anderson et al. |
| 9,784,054 | B2 | 10/2017 | Wilson et al. |
| 10,119,393 | B2 | 11/2018 | Derkacz et al. |
| 10,302,218 | B2 | 5/2019 | Standbridge et al. |
| 10,934,832 | B2 | 3/2021 | Gleitman |
| 11,156,080 | B2 * | 10/2021 | Bryant ............... E21B 45/00 |
| 11,808,144 | B1 * | 11/2023 | Su ............... E21B 17/0285 |
| 2004/0194951 | A1 * | 10/2004 | Maxwell ............ E21B 17/028 |
| | | | 166/66.5 |
| 2012/0075113 | A1 * | 3/2012 | Loi ............... E21B 44/00 |
| | | | 340/854.6 |
| 2018/0187539 | A1 * | 7/2018 | Hadi ............... E21B 12/00 |
| 2019/0010987 | A1 | 1/2019 | Chang |
| 2019/0100987 | A1 | 4/2019 | Pfrenger et al. |
| 2019/0316463 | A1 | 10/2019 | Pfrenger et al. |

FOREIGN PATENT DOCUMENTS

| | | |
|---|---|---|
| RU | 2692851 C1 | 6/2019 |
| WO | 2016148880 A1 | 9/2016 |

* cited by examiner

SECTION VIEW 4-4

SECTION VIEW 4-4

SECTION VIEW 10-10

INSTRUMENTED SUB

CROSS-REFERENCE TO RELATED APPLICATION(S)

This application claims priority under 35 U.S.C. § 119(e) to U.S. Provisional Application No. 63/370,839, entitled "INSTRUMENTED SUB," by Sergei KNIZHNIK et al., filed Aug. 9, 2022, which is assigned to the current assignee hereof and incorporated herein by reference in its entirety.

FIELD OF THE DISCLOSURE

The present invention relates, in general, to the field of drilling and processing of wells. More particularly, present embodiments relate to a system and method for measuring performance of and providing feedback to control equipment utilized for a subterranean operation.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes an instrumented sub for supporting subterranean operations. The instrumented sub also includes an upper portion containing a valve; a lower portion; a flow passage extending through the upper portion and the lower portion, where the valve selectively permits or restricts fluid flow through the flow passage; and a rotary interface coupled to the upper portion, the rotary interface may include a rotary portion and a stationary portion, where the rotary portion is rotationally fixed to the upper portion and rotates with the upper portion when the upper portion is rotated, where the stationary portion is rotationally coupled to the rotary portion, and where the rotary interface transfers communication signals between the stationary portion and the rotary portion to transmit commands or data to or receive the commands or data from one or more components of the instrumented sub.

One general aspect includes a system for performing a subterranean operation. The system also includes a top drive coupled to a rig and configured to move vertically relative to the rig; and an instrumented sub coupled to the top drive and which measures operational parameters during operation of the subterranean operation.

One general aspect includes a method for performing a subterranean operation. The method also includes coupling an instrumented sub to a top drive; moving the top drive, relative to a rig, along a substantially vertical path; positioning a plurality of anchors at vertically distributed locations along the rig and spaced horizontally away from the vertical path of the top drive; detecting, via a wireless interface, one or more of the plurality of anchors, where the wireless interface is coupled to the stationary portion of the instrumented sub; and determining, via a rig controller, a vertical position of the top drive along the vertical path based on the detecting of the one or more of the plurality of anchors. Other embodiments of this aspect include corresponding computer systems, apparatus, and computer programs recorded on one or more computer storage devices, each configured to perform the actions of the methods.

One general aspect includes a method for performing a subterranean operation. The method also includes coupling an instrumented sub between a top drive and a tubular string; coupling one or more conduits to the instrumented sub via a rotary interface of the instrumented sub; transmitting one or more communication signals through the rotary interface, where a portion of the rotary interface is configured to rotate relative to the top drive; and actuating a valve of the instrumented sub to adjust fluid flow through a flow passage extending through the instrumented sub in response to the one or more communication signals. Other embodiments of this aspect include corresponding computer systems, apparatus, and computer programs recorded on one or more computer storage devices, each configured to perform the actions of the methods.

One general aspect includes a method for performing a subterranean operation. The method also includes coupling an instrumented sub between a top drive and a tubular string; determining one or more operational parameters based on data from one or more sensors of the instrumented sub, and actuating a mud-saver valve integral to the instrumented sub between open and closed positions based on the one or more operational parameters. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

As used herein, "tubular" refers to an elongated cylindrical tube and can include any of the tubulars manipulated around a rig, such as tubular segments, tubular stands, tubulars, and tubular string. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

Figure 1:
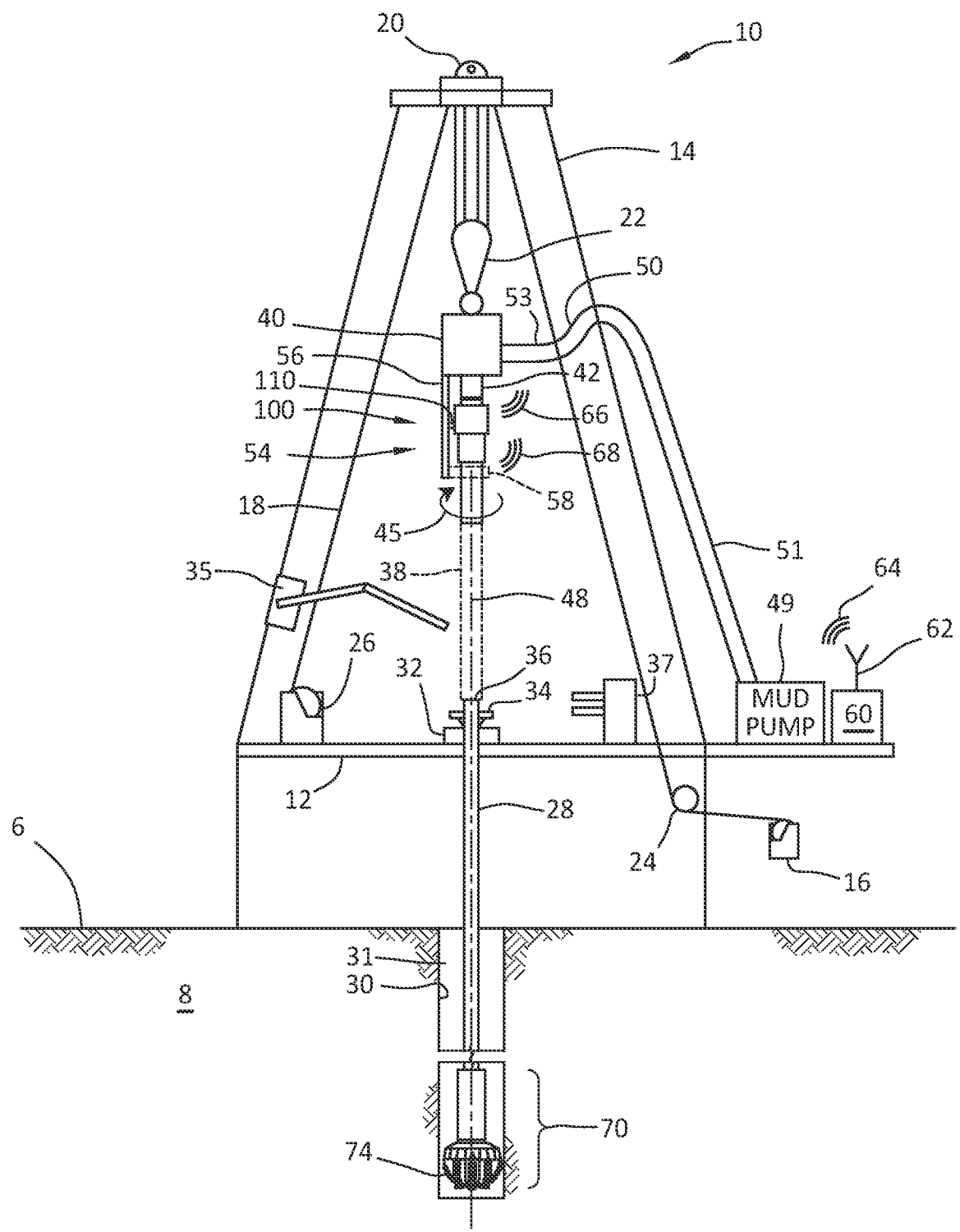
FIG. 1 is a representative partial cross-sectional view of a rig during a subterranean operation with an instrumented sub communicating parameter measurements to the rig, in accordance with certain embodiments.

Turning now to the drawings, FIG. 1 is a representative rig 10 in the process of extending a wellbore 30 through a surface 6 and into a formation 8, in accordance with present techniques. The rig 10 features an elevated rig floor 12 and a derrick 14 extending above the rig floor 12. A supply reel 16 supplies line 18 to a crown block 20 and traveling block 22 configured to hoist various types of equipment above the rig floor 12. The line 18 can be secured to a deadline tiedown anchor 24, and a drawworks 26 can regulate the amount of line 18 in use and, consequently, the height of the traveling block 22 at a given moment. Below the rig floor 12, a tubular string 28 extends downward into the wellbore 30 and can be held stationary with respect to the rig floor 12 by slips 34. A portion of the tubular string 28 extends above the rig floor 12, forming a stickup 36 to which another length of tubular 38 may be added. A lower end of the tubular string 28 can include a bottom hole assembly (BHA) 70 which can include one or more drill collars and a drill bit 74.

When a new length of tubular 38 is added to the tubular string 28, a top drive 40, hoisted by the traveling block 22, can position the tubular 38 above the wellbore 30 before coupling the tubular 38 with the tubular string 28. The top drive 40 can utilize a grabber system 54 to hold the tubular 38 while the top drive 40 is coupled to the tubular. The grabber system 54 may include a backup wrench (BUW) support 56 coupled to the top drive 40 and a backup wrench (BUW) 58 coupled to the end of the backup wrench (BUW) support 56 and configured to engage the tubular 38.

The top drive 40, once coupled with the tubular 38, may then lower the tubular 38 toward the stickup 36 such that the tubular 38 connects with the stickup 36 and becomes part of the tubular string 28. As the tubular 38 is lowered, the top drive 40 may rotate the tubular 38 (arrows 45). Specifically, the top drive 40 can include a quill 42 and an instrumented sub 100. The tubular 38 may be coupled to the instrumented sub 100, which can be coupled to the quill 42. In certain embodiments, a saver sub or a manual (or remote) internal blowout preventor sub (IBOP) 52 (see FIG. 2) may be coupled between the tubular 38 and the instrumented sub 100 to protect the mating threads of the instrumented sub 100 or provide a safety shutoff valve for detected events, such as kicks or blowouts. The top drive 40 can include a hoist support used to couple to a traveling block for raising and lowering the top drive 40.

Further, the top drive 40 can couple with the tubular 38 in a manner that enables translation of motion to the tubular 38. Indeed, in the illustrated embodiment, the top drive 40 is configured to supply torque for making-up and breaking-up a coupling between the tubular 38 and the stickup 36. However, torque for making-up or breaking-up a coupling between the tubular 38 and the stickup 36 can alternatively, or in addition to, be supplied by other equipment, such as a pipe handler 35 or an iron roughneck 37.

To facilitate the circulation of mud or other drilling fluid within the wellbore 30, the rig 10 can include a mud pump 49 configured to pump mud or drilling fluid up to the top drive 40 through a mud hose 50. In certain embodiments, the mud hose 50 may include a stand pipe 51 coupled to the derrick 14 in a substantially vertical orientation to facilitate pumping of mud. The stand pipe 51 provides a high-pressure path for mud to flow up the derrick 14 to the top drive 40. From the mud hose 50 (e.g., stand pipe 51), the mud flows through a kelly hose 53 to the top drive 40. From the top drive 40, the drilling mud will flow through internal passages of the instrumented sub 100, into internal passages of the tubular 38 and the tubular string 28, to the bottom of the tubular string 28. The drilling mud flows within the wellbore 30 (e.g., in an annulus 31 between the tubular string 28 and the wellbore 30) and back to the surface where the drilling mud may be recycled (e.g., filtered, cleaned, and pumped back up to the top drive 40 by the mud pump 49).

When a new tubular 38 is to be added to the tubular string 28, mud flow from the mud pump 49 and the mud hose 50 can be stopped, and the top drive 40 decoupled from the tubular string 28 (i.e., the length of tubular 38 most recently added to the tubular string 28). When the top drive 40 releases the tubular string 28, mud within the top drive 40 may run out of the top drive 40 and onto the rig floor 12. To avoid spilling mud onto the rig floor 12, the instrumented sub 100 can include a mud saver valve to block mud from inadvertently flowing out of the top drive 40 when the top drive along with the instrumented sub 100 is decoupled from the tubular string 28. When the top drive 40 is thereafter coupled to the new tubular 38 just added to the tubular string 28 and the mud pump 49 resumes a pumping operation, the mud saver valve of the instrumented sub 100 may again enable flow of mud through the instrumented sub 100 and the top drive 40 to the tubular 38 and tubular string 28.

The rig controller 60 may be configured to regulate operation of the mud pump 49 and/or other features of the rig 10. For example, the rig controller 60 may be configured to regulate a flow rate of mud or other drilling fluid circulated through the tubular string 28 and the wellbore 30 during installation of tubular elements (e.g., tubular 38). For example, the rig controller 60 may regulate operation of the mud pump 49 to start, stop, increase, and/or decrease mud flow into the tubular string 28 and wellbore 30 during installation of tubular 38 elements. The rig controller 60 may also regulate other components of the rig 10 to control flow of drilling mud or receive sensor data from surface and downhole sensors. For example, the rig controller 60 may receive wirelessly transmitted data 68 from the instrumented sub 100 or transmit wirelessly transmitted data 68 to the instrumented sub 100, which can detect and transmit various rig operation parameters such as torque applied by the top drive 40, rotational parameters of the tubular string 28, various sensor data (such as sensor to determine toolface), vibration signals traveling through the tubular string 28, and possibly mud pulses traveling through the mud in the tubular string 28. The rig controller 60 may also receive wirelessly transmitted data 66 from the top drive 40 via a wireless antenna 62, or send wirelessly transmitted data 64 to either the instrumented sub 100 or the top drive 40.

The current disclosure provides a novel instrumented sub 100 that can provide more frequent and more direct measurements than typically available on a rig 10 thus improving accuracy of the measurements, such as hook load, top-drive torque, internal pressure of the tubular string 28, differential pressure across the mud saver valve, depth of the tubular string 28, RPM (revolutions per minute), temperature, top drive ranging, angular orientation, etc. The instrumented sub 100 can also provide currently rare or unavailable measurements, such as bend, vibration, shock, state of the mud saver valve, etc. The instrumented sub 100 can also provide remote control of the mud saver valve actuator to selectively open or close the mud saver valve without coupling an external actuator to the mud saver valve for actuation. The instrumented sub 100 can be used for all activities involving a top drive (e.g., drilling, casing, logging, etc.)

It should be noted that the illustration of FIG. 1 is intentionally simplified to focus on the instrumented sub 100 (described in more detail below) that can be coupled between the tubular string 28 and the top drive 40. The instrumented sub 100 rotates with the tubular string 28, measures rig operation parameters, and wirelessly communicates the parameters to the rig controller 60. The instrumented sub 100 also allows remote control of an integral mud saver valve to minimize spillage of mud when the tubular string 28 is being tripped out or tripped in the wellbore 30. Many other components and tools may be employed during the various periods of formation and preparation of the well. Similarly, as will be appreciated by those skilled in the art, the orientation and environment of the well may vary widely depending upon the location and situation of the formations of interest. For example, rather than a generally vertical bore, the well, in practice, may include one or more deviations, including angled and horizontal runs. Similarly, while shown as a surface (land-based) operation, the well may be formed in water of various depths, in which case the topside equipment may include an anchored or floating platform.

Figure 2:
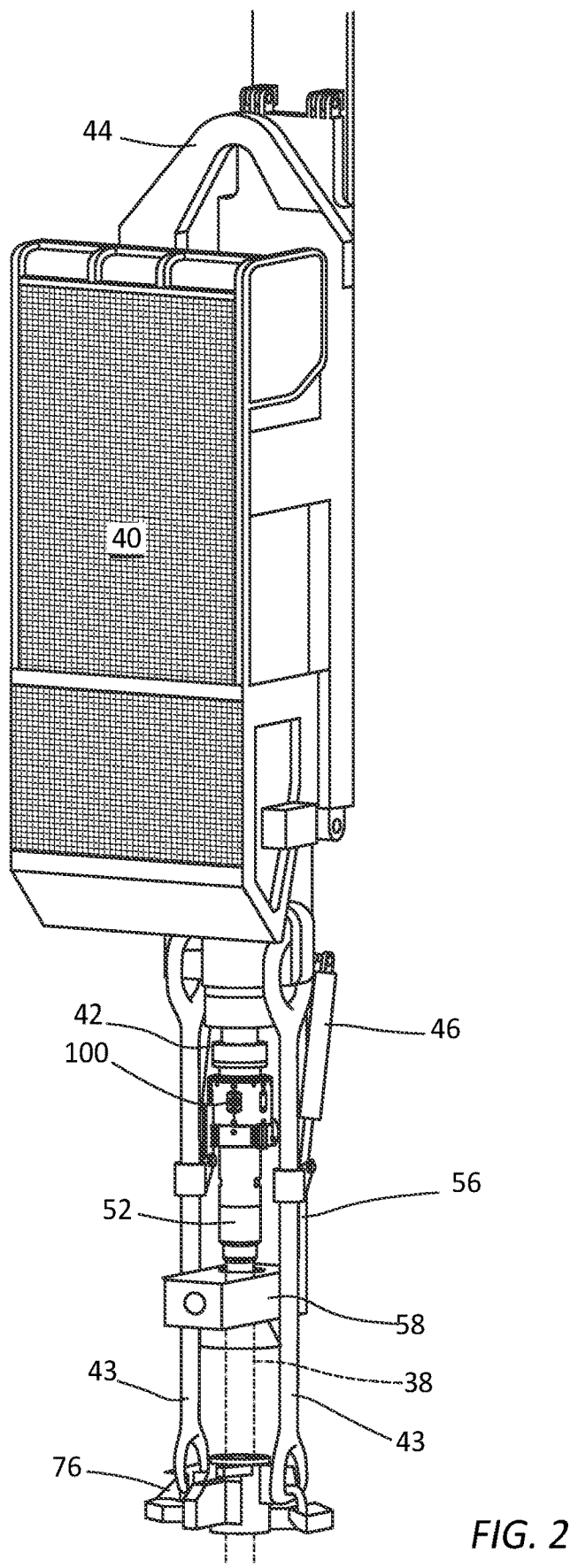
FIG. 2 is a representative perspective view of an instrumented sub coupled between a tubular string and a top drive, in accordance with certain embodiments.

FIG. 2 is a representative perspective view of an instrumented sub 100 coupled between a tubular string 28 and a quill 42 of a top drive 40. A saver sub or internal blowout preventer sub 52 can be coupled between the tubular string 28 and the instrumented sub 100. The top drive 40 can include a hoist support coupled to the traveling block 22 for raising and lowering the top drive 40. A quill 42 can extend below the top drive 40 and couple to the instrumented sub 100. The quill 42 is driven by the top drive 40 to control rotation of the tubular string 28. Since the instrumented sub 100 is coupled between the quill 42 and the tubular string 28, the instrumented sub 100 can be used to measure the torque being applied to the tubular string 28 via the top drive 40. It is preferred, that when the instrumented sub 100 and the sub 52 are coupled to the quill 42, the backup wrench 58 can extend below the sub 52 so the backup wrench 58 can engage the box end of the tubular 38 for making-up or breaking-up a connection of the tubular 38 to the sub 52 (when used) or the instrumented sub 100 when the sub 52 is not used. The elevator 76, the pair of links 43, and the link tilt actuators 46 can be used to hoist the tubular 38 to align with the center axis 48 (see FIG. 1) of the tubular string 28.

Figure 3:
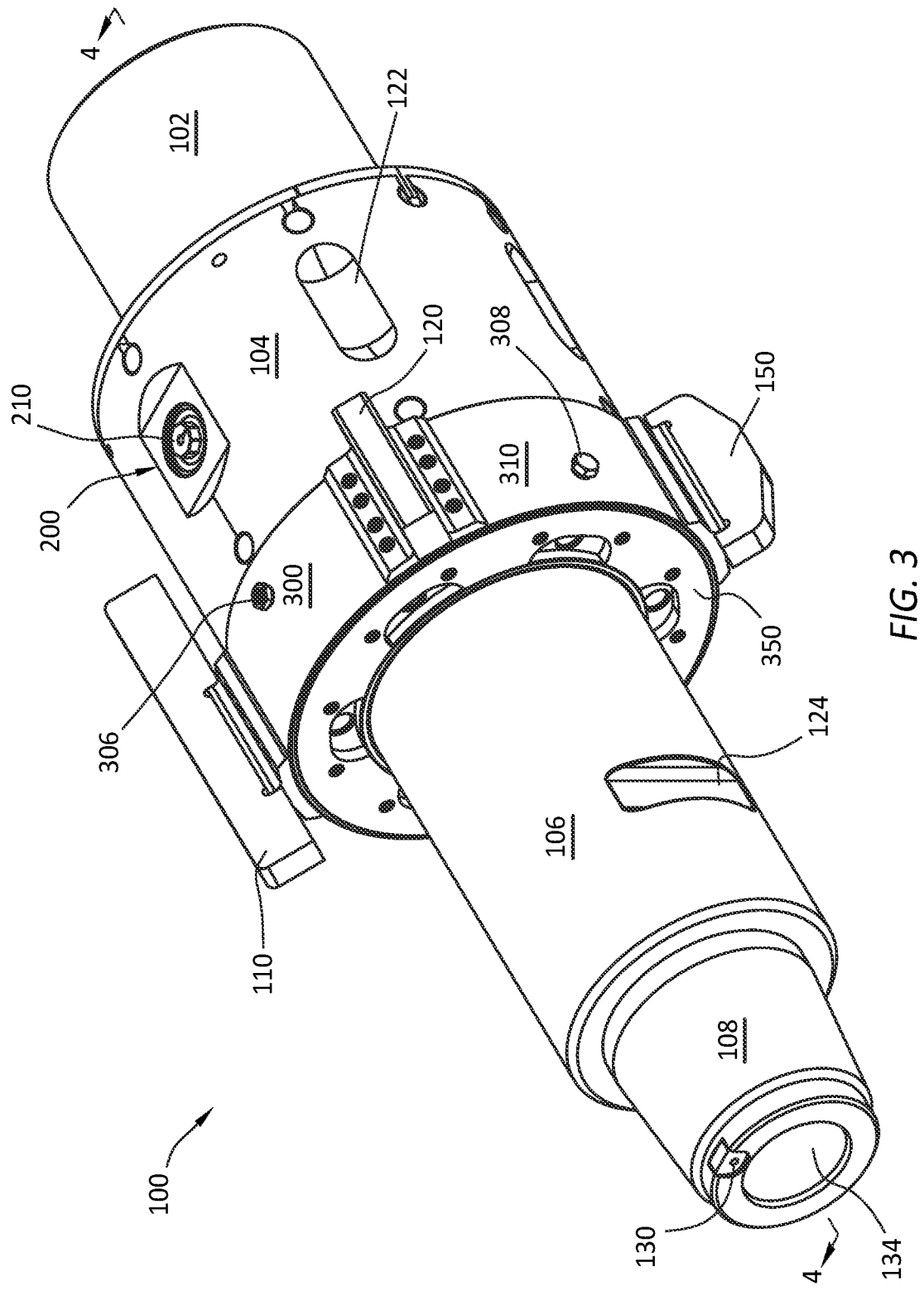
FIG. 3 is a representative perspective view of an instrumented sub, in accordance with certain embodiments.

FIG. 3 is a representative perspective view of an instrumented sub 100, which can include a box end 102 for coupling to the quill 42 of the top drive 40; an enlarged upper portion 104 that can contain a valve 200, instrumentation (described below), and a rotary interface 300; a lower portion 106; and a pin end 108 that can be used to couple to a sub 52, or a tubular string 28. The upper portion 104 can include strain gauges in an annular groove that is axially positioned at the rotary interface 300. These strain gauges can be calibrated by torquing the upper portion 104 relative to the lower portion 106, via the calibration coupling features 122, 124. By securing a hold wrench (not shown) to the lower portion 106 via the calibration coupling feature 124, rotation of the lower portion 106 relative to the hold wrench can be prevented. By securing a torque wrench (not shown) to the upper portion 104 via the calibration coupling feature 122, rotation of the upper portion 104 relative to the torque wrench can be prevented.

Therefore, when the torque wrench is rotated relative to the hold wrench, the upper portion 104 will tend to rotate relative to the lower portion 106, thereby causing strain on the instrumented sub 100 between the upper and lower portions 104, 106. The strain gauges positioned between the upper and lower portions 104, 106 can sense the torque being applied to the upper portion 104. With a known torque being applied to the upper portion 104, the strain gauges and the control electronics that receive sensor information from the strain gauges can be calibrated and then used to sense an unknown torque applied to the upper portion 104 via the top drive (for example). Similarly, strain gauges that are sensitive to axial loads can be calibrated and utilized for measuring hook load (i.e., tension on sub 100), compression on sub 100, bending forces on the sub 100, etc.

The valve 200 can be actuated manually via the drive shaft 210, but it is preferred that the actuation of the valve 200 be locally or remotely controlled via hydraulic (or electric) controls. Operation of the valve 200 will be described in more detail below.

The rotary interface 300 provides an interface for transferring communication signals (e.g., control, data, or power signals) between the rig 10 and the instrumented sub 100 when the upper and lower portions 104, 106 are being rotated with the tubular string 28 or when the upper and lower portions 104, 106 are not being rotated as when rotation of the tubular string 28 has stopped. The rotary interface 300 can include a rotary portion 350 and a stationary portion 310. The rotary portion 350 can rotate with the upper and lower portions 104, 106 and the stationary portion can be rotationally fixed relative to the grabber system 54. The stationary portion 310 can include an anchor 110 that engages a portion of the grabber system 54 and anchors the stationary portion 310 to the grabber system 54. Therefore, the anchor 110, and thus the stationary portion 310, can be rotated relative to the rig 10 or the tubular string 28 when the grabber system 54 is rotated relative to the rig or the tubular string 28.

A wireless interface 150 can be attached to the stationary portion 310 for wirelessly communicating to the rig controller 60 (or any other wireless interfaces). The wireless interface 150 can be electrically coupled to the electronics in the instrumented sub 100 via the rotary interface 300 to transfer communication signals to and from the instrumented sub 100. The communication signals can be routed through the rotary interface 300 to transfer data, control, or power between the wireless interface 150 (or the rig controller 60, or the top drive 40) and the instrumented sub 100.

One or more permanent magnets 120 can be attached to the stationary portion 310. In the embodiment shown in FIG. 3, one or more permanent magnets 120 are attached to the stationary portion 310. Magnetometers on the rotating portions (e.g., upper and lower portions 104, 106) can be used to sense magnetic fields generated by the one or more permanent magnets 120. They can detect variations in the magnetic field as the instrumented sub 100 rotates providing information to the instrumented sub 100 controller which can use the information to determine rotational characteristics of the instrumented sub 100 relative to the grabber system 54, and thus determine rotational characteristics of the tubular string 28.

The valve 200 can be hydraulically actuated through the rotary interface 300, where conduits (e.g., hydraulic control lines, electrical communication lines, pneumatic control lines, etc.) can be coupled to the rotary interface 300 via ports 306, 308. According to a certain embodiment, the rotary interface 300 can provide a hydraulic rotary manifold that allows the hydraulic control signal to be routed from the stationary portion 310, to the rotary portion 350, and to the valve control (not shown). By reversing polarity of the hydraulic control signal, the valve 200 can be actuated between open and closed positions. With hydraulic remote actuation of the valve 200, one or more drain ports 308 can be provided in case manual actuation of the valve 200 is desired. By removing the cap at the port 308, captive hydraulic pressure in the instrumented sub 100 can be released to allow manual operation of the valve 200.

Alternatively, or in addition to, the valve 200 can be actuated via local control. Pressurized hydraulics can be provided via the rotary interface with the ports 306 being pressurized fluid inputs and the ports 308 can be respective drain ports for allowing valve actuation. The instrumented sub 100 can include a single compact directional control valve, a couple of compact solenoid-control valves, or other suitable valve control for controlling applying pressure to either side of an actuation piston to actuate the valve 200. For example, according to a certain embodiment, a directional valve can redirect the high pressure to the piston 250 (see FIG. 9) to open the valve 200 or to the piston 254 (see FIG. 9) to close the valve 200. For example, according to a certain embodiment, compact solenoid valves can be mounted in the rotary portion 350. The rotary interface 300 can couple electrical signals from the stationary portion 310 to the rotary portion 350 and to the valve control (not shown). For example, according to a certain embodiment, the rotary interface 300 can also couple power from the stationary portion 310 to the rotary portion 350 for powering valve electric actuators.

A pressure sensor 130 can be disposed in the pin end 108 or in any other position that is exposed to fluid flow in the passage 134 of the lower portion 106. When the instrumented sub 100 is coupled to the tubular string 28 (such as directly or through a sub 52), the pressure sensor 130 can be in fluid communication with the internal flow passage 134 of instrumented sub 100 downstream from the valve 200. This allows the instrumented sub 100 to measure the internal fluid pressure of the tubular string 28. With another pressure sensor (not shown) in fluid communication with the flow passage 132 upstream from the valve 200, a differential pressure across the valve 200 can be directly measured, which is beneficial to the rig operations.

Figure 4:
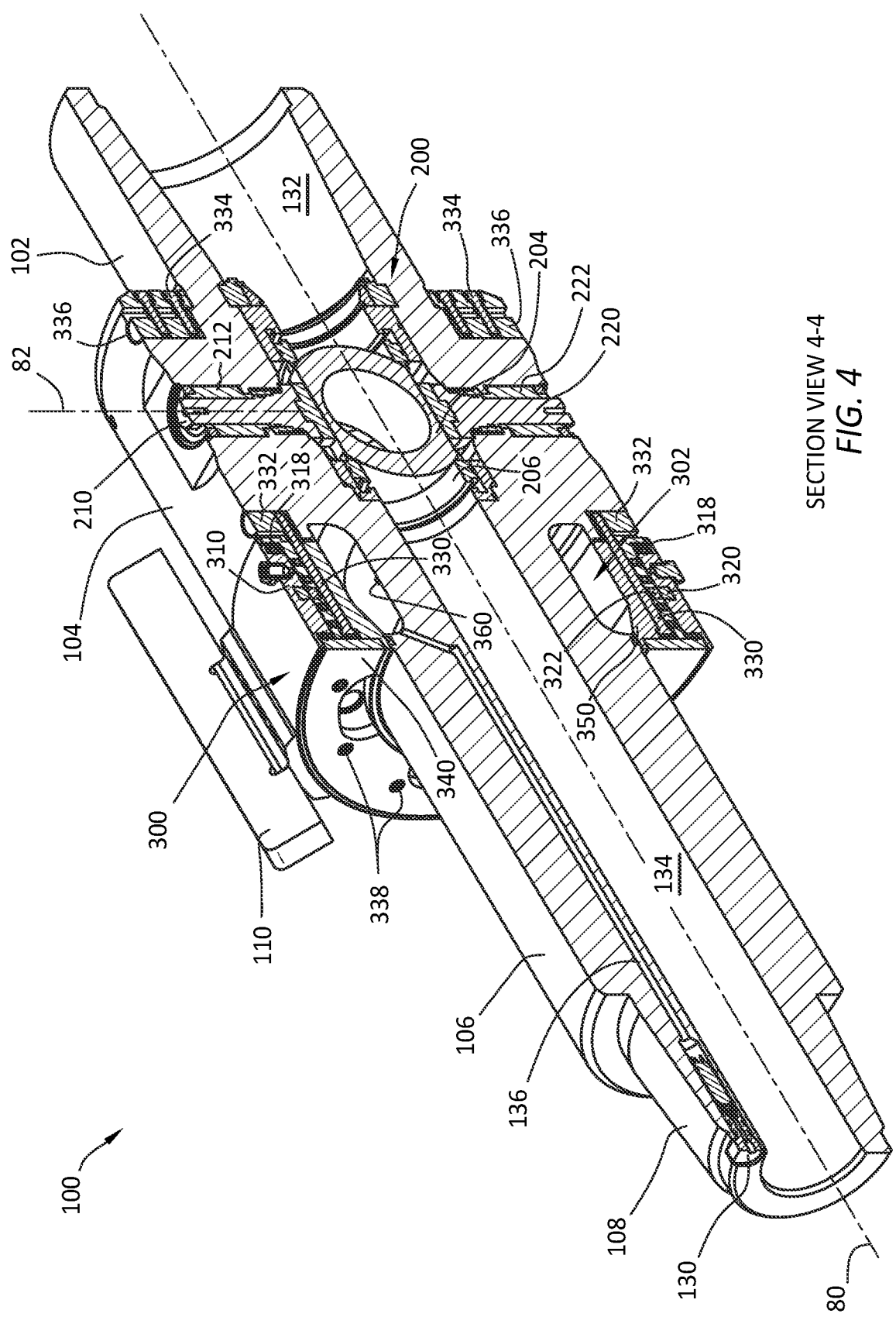
FIGS. 4 and 5 are a representative partial cross-sectional views 4-4, as indicated in FIG. 3, of the instrumented sub with an integral valve, in accordance with certain embodiments.
Figure 5:
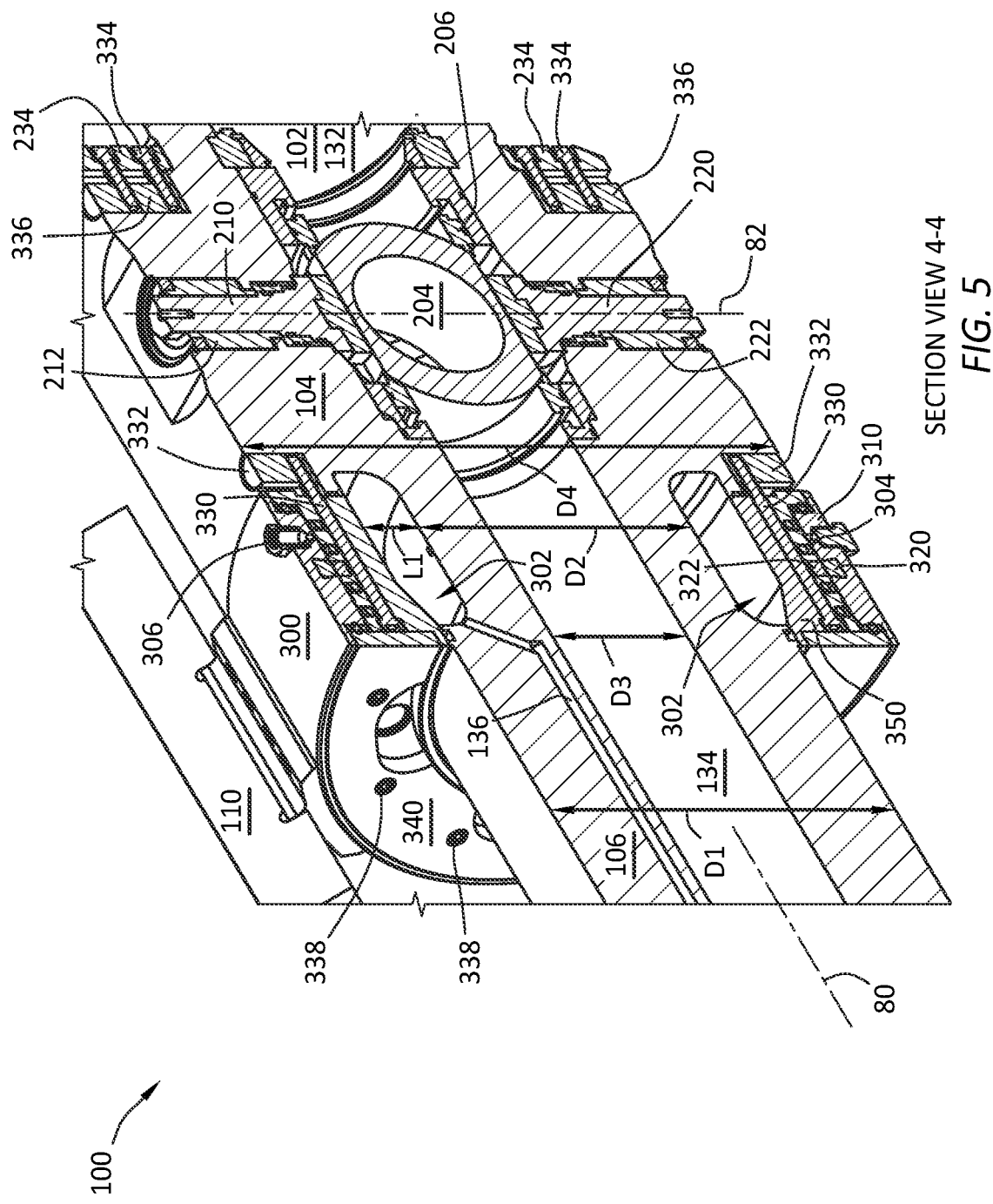

FIGS. 4 and 5 are representative partial cross-sectional views along section line 4-4 in FIG. 3 of the instrumented sub 100 with an integral valve 200, in accordance with certain embodiments. Referring now to FIG. 4, the valve 200 is shown partially open, which is rotationally positioned between the fully closed and fully open positions of the valve 200. The valve 200 can include a ball valve 204 with a flow passage formed therethrough. The ball valve 204 can be coupled to a drive shaft (or stem) 210 on one side and a drive shaft 220 on an opposite side. It should be understood that only one drive shaft can be used to operate the valve 200. However, it is preferred to use two drive shafts as shown, which can provide a higher torque to rotate the ball valve 204 between fully opened and fully closed positions. A drive gear 212 (or pinion 212) can be rotationally fixed to the drive shaft 210, so that when rack pistons rotate the gear 212, the ball valve 204 can be rotated. A drive gear 222 (or pinion 222) can be rotationally fixed to the drive shaft 220, so that when rack pistons rotate the gear 222, the ball valve 204 can be rotated about the axis 82, which can be generally perpendicular to the center axis 80 of the instrumented sub. The gears 212, 222 can be synchronously controlled to cooperate with each other to rotate the ball valve 204 for actuating the valve 200. The valve 200 can include seats (e.g., seats 206) and retainers as needed to secure and seal the ball valve 204 in the desired location in the valve 200.

The upper portion 104 can include a radially reduced annular groove 302 above which the rotary interface can be installed. The rotary portion 350 of the rotary interface 300 can be removably attached to the upper portion 104 via fasteners 330 installed through the rotary portion 350 and threaded into the upper portion 104. In a certain embodiment, inserts 332 can be installed in cylindrical openings in the upper portion, each insert including a threaded opening to receive the fastener 330. The fasteners 330 rotational fix the rotary portion 350 to the upper portion 104. However, the rotary portion 350 is not rotationally fixed to the lower portion 106, so that the lower portion 106 can twist relative to the upper portion 104, such as when the top drive 40 is rotating the tubular string 28. The angular twist of the lower portion 106 relative to the upper portion 104 is optimized such that, under the maximum operating torque of the top drive 40, mechanical strain created on the surface of the annular groove 302 fits within the recommended range for the sensors (e.g., strain gauges) 360 bonded to that surface of the annular groove 302.

After installation of the rotary portion 350, via fasteners 330, the stationary portion 310 can be installed over the rotary portion 350 and a ring cover 340 can be attached to the lower end of the rotary portion 350 to retain the rotary portion 350 positioned radially above the rotary portion 350. The ring cover 340 can be removably attached to the rotary portion 350 via fasteners 338. However, it should be understood that other attachment features can be used to secure the ring cover 340 to the rotary portion 350. When the rotary interface 300 is assembled, annular grooves and rotary seals provide fluid communication channels that can be used to receive hydraulic signals from the stationary portion 310 and transmit the hydraulic signals through an appropriate channel to provide hydraulic control of the instrumented sub 100, such as actuating the valve 200. Alternatively or in addition to, the rotary interface 300 can be used to transmit electrical signals and power between the rotary portion 350 and the stationary portion 310 to control aspects of the instrumented sub 100 and receive data from the instrumented sub 100.

In either of the hydraulic or electrical embodiments, power can be supplied to the instrumented sub 100 via one or more induction coil pairs disposed in the rotary interface 300. Each induction coil pair can include a secondary induction coil 322 and a primary induction coil 320. In a certain embodiment, one induction coil pair can be used to deliver power and or communication signals to the instrumented sub 100. The secondary induction coil 322 can be disposed in an annular groove in the rotary portion 350 and rotationally fixed to the rotary portion 350. Therefore, when the upper portion 104, the lower portion 106, and the rotary portion 350 rotate, the secondary induction coil 322 will rotate with them and will rotate relative to the primary induction coil 320.

The primary induction coil 320 can be disposed in an annular groove in the stationary portion 310 and rotationally fixed to the stationary portion 310. Therefore, when the secondary induction coil 322 rotates, the primary induction coil 320 will remain stationary relative to the stationary portion 310. As can be seen, the primary induction coil 320 is positioned radially outward from the secondary induction coil 322, and axially aligned with the secondary induction coil 322. As current is induced in the primary induction coil 320, the electromagnetic coupling between the primary and secondary induction coils 320, 322 will indue current in the secondary induction coil 322, thereby delivering power or communication signals to the instrumented sub 100 components. Additionally, a slip ring 318 can be incorporated into the rotary interface 300 to couple electrical signals (e.g., from a wired tubular string 28) through the rotary interface 300, and to components of the instrumented sub 100. For wired tubular connections, the pin end 108 can be configured to couple the wires in the wired tubular string 28 to the instrumented sub 100 and transfers signals between the wired tubular string 28 and the instrumented sub 100 or through the rotary interface 300. The slip ring 318 can be used to transfer power from the top drive 40 through the rotary interface 300, through the body of the lower portion 106, and to a wired connection at the pin end 108. The power from the top drive 40 and data (e.g., for communication to a downhole tool) can be combined by the instrumented sub 100 components and transmitted through a wire of the wired tubular string 28 to transfer power and data to the downhole tool via the wired tubular string 28.

The pressure sensor 130 can be coupled to a controller of the instrumented sub 100 via a conductor (e.g., electrical conductor, optical fiber, etc.) which can be routed from the pressure sensor 130 to the controller via the passage 136 in the wall of the lower portion 106 and the pin end 108.

Referring now to FIG. 5, the annular groove 302 is preferred to have a radially reduced diameter D2 compared to the outer diameter D1. The outer diameter D2 can be optimized such that, under the maximum tortional and axial operating loads of the top drive 40, strains induced on the surface of annular groove 302 will substantially match the operating range of the strain gauges 360 bonded to the surface of annular groove 302. The internal flow passage 134 (with inner diameter D3) can be configured to provide fluid flow through the lower portion 106. The inner diameter of the box end 102 can be radially larger than the diameter D3 to accommodate installation of the valve 200. The upper portion 104 can have an enlarged outer diameter D4 that is radially extended past the diameters D1 and D2.

Cylindrically shaped retainers 336 can be installed in openings in the upper portion 104 and configured to receive threaded fasteners 334 to removably attach arcuate segments 234 that secure components of the instrumented sub 100. These components can be a module comprising electronics circuitry (e.g., for command, control, and data processing); one or more sensors; one or more energy storage devices; or combination thereof; that can be installed in bores 276 that are substantially parallel to a center axis 80 of the instrumented sub 100.

Figure 6:
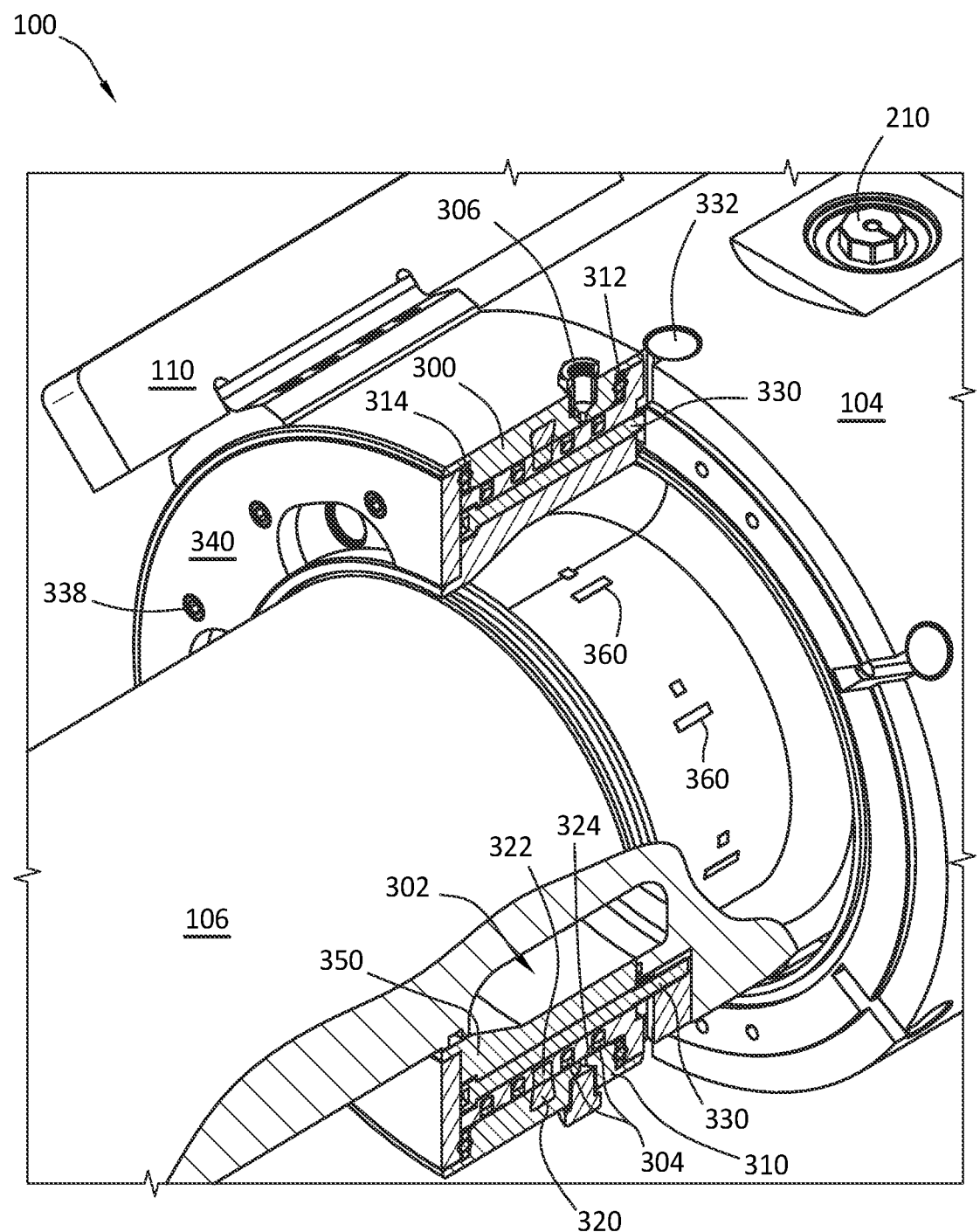
FIG. 6 is a representative partial cross-sectional view of a rotary interface of an instrumented sub, in accordance with certain embodiments.

FIG. 6 is a representative partial cross-sectional view of a rotary interface 300 of an instrumented sub 100, in accordance with certain embodiments. The rotary interface 300 is shown in cross-section to illustrate interfaces between the stationary portion 310 and the rotary portion 350. As can be seen, various sensors 360 (e.g., strain gauges, magnetometers, accelerometers, can be installed in the annular groove 302 radially below the rotary interface 300. The one or more sensors 360 can be distributed along the annular groove 302 as desired for parameter measurements. The reduced diameter D2 of the annular groove 302 can provide increased sensitivity to torque and torsional forces applied to the box end 102 or to the pin end 108 of the instrumented sub 100. Generally, the torque or torsional forces can be applied to a tubular string 28 by the top drive 40 driving the box end 102 via the quill 42 and the instrumented sub 100 transmitting the torque or torsional forces to the tubular string 28 (e.g., directly or via a sub 52). Torsional distortions of the instrumented sub 100 can be detected by the sensors 360 and transmitted to a controller on board the instrumented sub 100 or remotely to the rig controller 60 via wireless network telemetry.

Rotary seals 304 can be disposed in annular grooves in the rotary portion 350 to seal against the stationary portion 310 when the rotary interface 300 is assembled. A pair of rotary seals 304 can be positioned on either side of an annular fluid path to seal the annular fluid path from adjacent annular fluid paths in the rotary interface 300. In the embodiment of FIGS. 4-6, there are two pairs of rotary seals 304 with one annular fluid path 324 positioned axially between each pair of annular seals. Therefore, in this configuration, the rotary interface 300 can support two or three annular hydraulic fluid paths 324 that can be used to operate hydraulic actuators in the instrumented sub 100. Each of the annular fluid paths 324 are in fluid communication with a respective port 306 in the stationary portion 310, which can be connected to hydraulic fluid control lines for remote actuation of one or more components of the instrumented sub 100. The annular groove 302 can be used to route signal conductors from the sensors 360 to electronics circuitry (e.g., a controller, a processor, a signal conditioner, etc.) in the upper portion 104.

Figure 7:
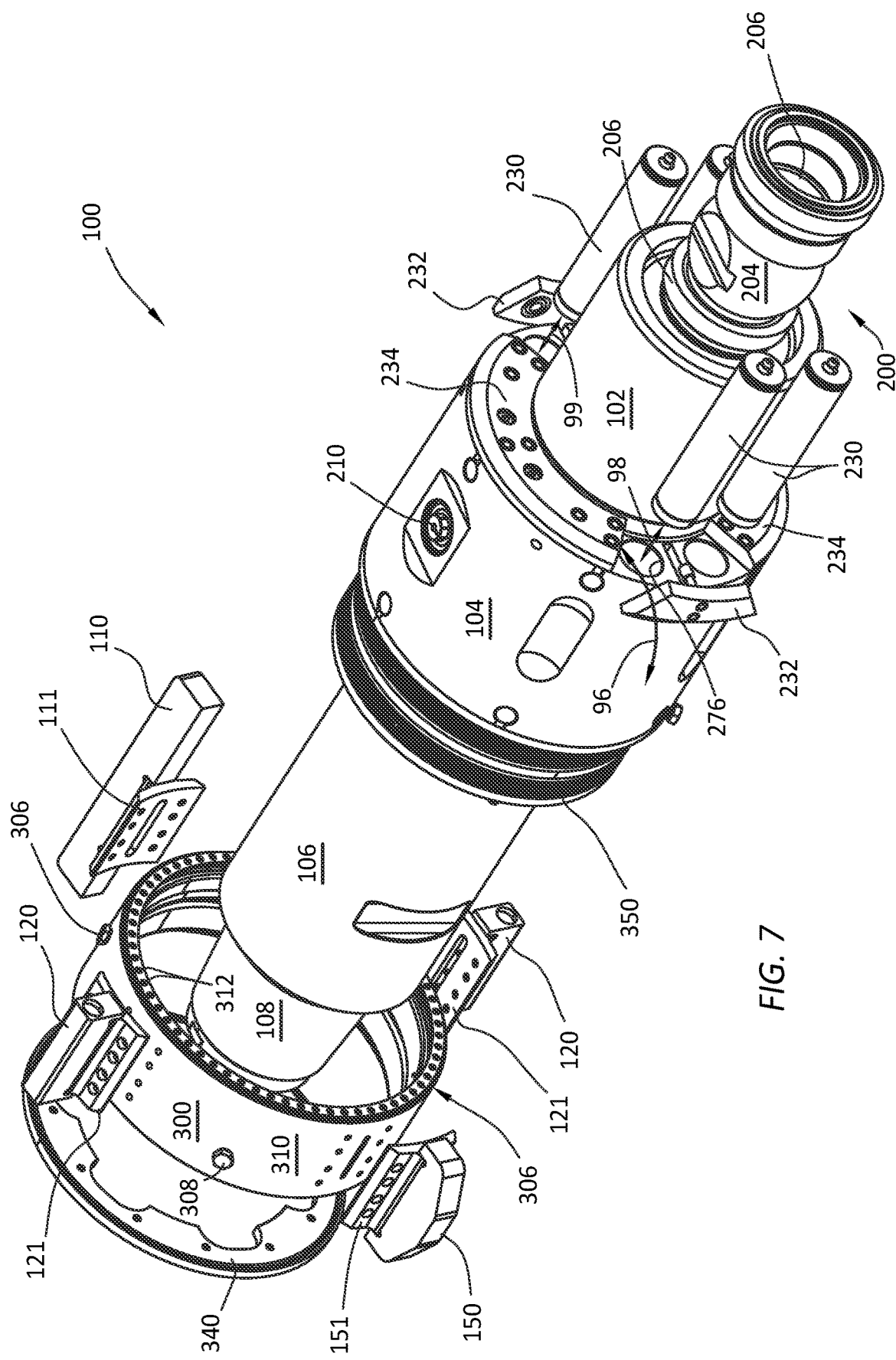
FIGS. 7 and 8 are a representative partial exploded views of an instrumented sub, in accordance with certain embodiments.
Figure 8:
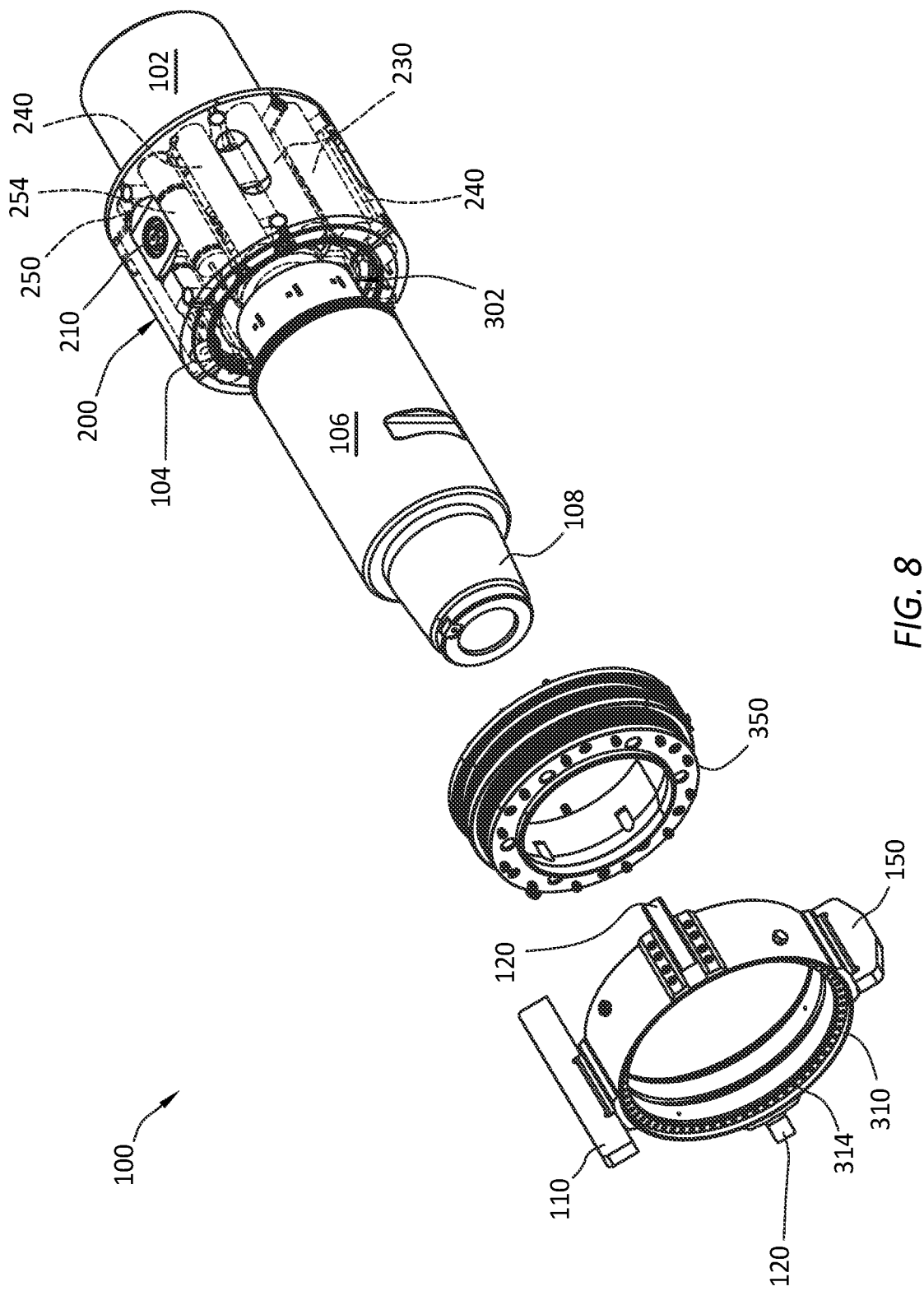

FIGS. 7 and 8 are representative partial exploded views of an instrumented sub 100, in accordance with certain embodiments. Referring now to FIG. 7, in this exploded view, bearings 312 on the stationary portion 310 can be seen. The bearings 312 can engage the rotary portion 350 to allow the rotary portion 350 to rotate with respect to the stationary portion 310. Mounting brackets 121 can be used to securely mount the magnets 120 to the stationary portion 310. Mounting bracket 151 can be used to securely mount the wireless interface 150 to the stationary portion 310. Mounting bracket 111 can be used to securely mount the anchor 110 to the stationary portion 310. The mounting brackets 111, 121, 151 can be used to attach the respective components (the anchor 110, the magnets 120, and the wireless interface 150) to the stationary portion 310 such that they are removable when the instrumented sub 100 is interconnected between the top drive 40 and the tubular string 28. However, alternatively, the mounting brackets 111, 121, 151 can be used to attach the respective components (the anchor 110, the magnets 120, and the wireless interface 150) to the stationary portion 310 such that they are not removable when the instrumented sub 100 is interconnected between the top drive 40 and the tubular string 28. In this configuration, the pin end 108 of the instrumented sub 100 will need to be disconnected from sub 52 or tubular string 28 in order to remove the components.

As can be seen in FIG. 8, bearings 314 be positioned between the ring cover 340 and the rotary portion 350 to allow the rotary portion 350 and the ring cover 340 to rotate with respect to the stationary portion 310.

Referring back to FIG. 7, the radially enlarged diameter of the upper section allows space in the body of the upper section 104 to include one or more bores 276 formed parallel to the center axis 80 of the instrumented sub 100 and spaced radially outward from the center flow passage 132, 134. Cylindrically shaped modules can be installed in each of these bores 276, with the modules secured in the bores 276 when the arcuate segments 232, 234 are attached to the upper portion 104. The arcuate segments 232 can be removable (arrows 96) while the instrumented sub 100 is interconnected to the tubular string 28 to facilitate energy storage module 230 replacement (e.g., battery, capacitor, hydraulic energy storage device, etc.). Each arcuate segment 232 can be removed to allow removal and replacement (arrows 98, 99) of energy storage modules 230. The arcuate segments 234 can also be removed while the instrumented sub 100 is interconnected to the tubular string 28 to facilitate removal or replacement of one or more modules installed in the bores 276.

Referring now to FIG. 8, the upper portion 104 is shown with some components being translucent to view the internal components. The bores 276 containing cylindrical modules are spaced circumferentially around upper portion 104. The modules can be equally spaced around the upper portion 104; however, it is not necessary for the modules to be equally spaced. The bores 276 can be used to receive cylindrically shaped modules (e.g., energy storage modules 230, electronics modules 240, etc.) as well as pistons (e.g., pistons 250, 254) for actuating the valve 200. The bores 276 can be configured to seal the cylindrical modules from environmental fluids and debris while providing electric, hydraulic, or optical connections to the cylindrical modules. An electronics module 240 can include a large amount of non-transitory memory which can be used by a controller in the instrumented sub 100 (e.g., in the same or separate electronics module) to store sensor data collected or received by the instrumented sub 100 while the rig operation is being executed. At periodic intervals (or at random intervals) rotation of the instrumented sub 100 can cease to allow for removal/replacement of the electronics memory module 240 (while the instrumented sub remains coupled to the top drive) so that the stored sensor data in the electronics memory module 240 can be manually retrieved and a new electronics memory module 240 reinstalled in its place. The rig operation does not have to stop while the electronics memory module 240 is being replaced with a new one, just that the instrumented sub 100 should not be rotating while the electronics memory module 240 is being replaced. This can occur at normal times when the top drive is not rotating the instrumented sub 100 or at scheduled times when the top drive 40 rotation is ceased to allow for the electronics memory module 240 replacement.

Figure 9:
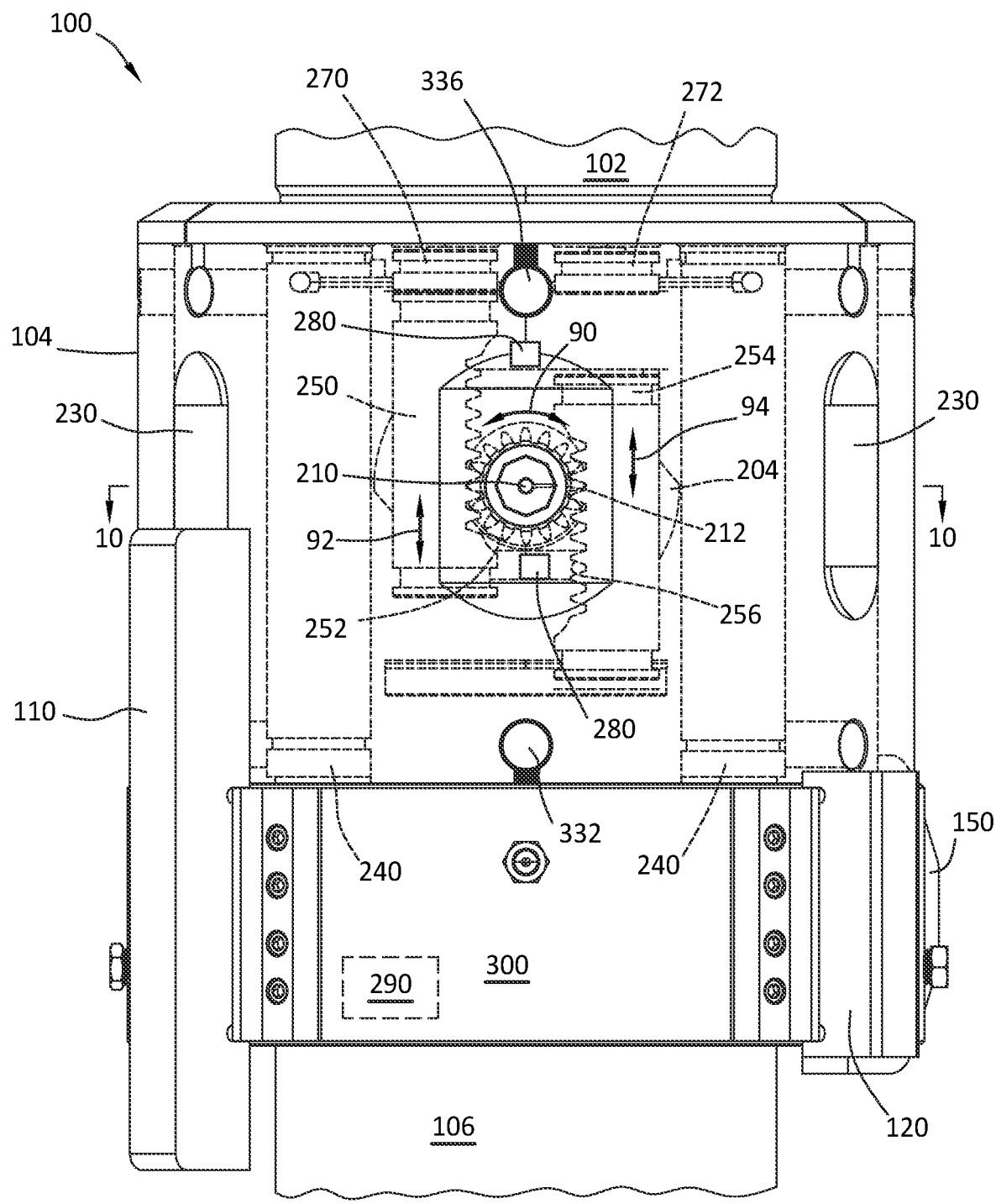
FIG. 9 is a representative translucent side view of a portion of an instrumented sub, in accordance with certain embodiments.

FIG. 9 is a representative translucent side view of an upper portion 104 of an instrumented sub 100, in accordance with certain embodiments. Energy storage modules 230 are shown installed in their respective bores 276, with electronic modules installed in their respective bores 276. It should be understood that it is not required that the modules are configured as shown in the figures. Various other configurations of one or more energy storage modules and one or more electronics modules can be utilized as desired, in keeping with the principles of this disclosure. Two pistons 250, 254 are shown in a rack and pinion configuration for actuating the valve 200 (i.e., rotating the drive shaft 210). The piston 250 can be installed in a bore 276 on one side of the drive gear (or pinion) 212, with the piston 254 installed in a bore 276 on an opposite side of the drive gear (or pinion) 212. Each piston 250, 254 can include a rack 252, 256, respectively, where each rack 252, 256 engages opposite sides of the drive gear 212.

Hydraulic pressure can be applied to the piston 250 to move it up or down (arrows 92) in the bore 276 and rotate the drive gear 212 (arrows 90). Synchronously, hydraulic pressure can be applied to the piston 254 to move it down or up (arrows 94) in the bore 276 (opposite movement relative to the piston 250) and rotate the drive gear 212 (arrows 90). As the drive gear is rotated (arrows 90), the ball 204 is rotated between closed and open positions to selectively restrict or enable fluid flow through the instrumented sub 100. Since it is beneficial that the ball 204 rotate completely between fully closed and fully open positions to minimize wear on the ball 204, piston stops 270, 272 can be used to adjust the travel of the respective piston 250, 254. This allows the rotation of the ball 204 to be calibrated to ensure that proper opening and closing of the valve 200 occurs.

A second pair of pistons 260, 264 (see FIG. 10) can be utilized to assist in actuation of the valve 200. The second pair of pistons 260, 264 can be positioned on an opposite side of the ball 204 and engaged to a drive gear 222 via respective racks 262, 266. The second pair of pistons 260, 264 operate much the same way as the pistons 250, 254 and the description above regarding the operation of the pistons 250, 254 generally applies to the operation of the pistons 260, 264. The pistons 260, 264 can be synchronously operated to cooperate with the pistons 250, 254 to actuate the valve 200.

An electronics module 240 can include a controller (e.g., processor, microprocessor, digital signal processor [DSP], field-programmable gate array [FPGA], programmable logic device [PLD], state machine, neural network, machine learning circuitry, etc.), non-transitory memory, sensors (e.g., magnetometers, accelerometers, gyroscopes, temperature sensors, pressure sensors, strain gauges, control logic, signal conditioners, power distribution circuitry, etc.), or combinations thereof. The controller can be coupled to the non-transitory memory and sensors for transferring data and control between to/from them. The controller can be coupled to the wireless interface 150 for receiving wireless commands and data from an external source (e.g., the rig controller 60) or transmitting wireless commands and data to an external receiver (e.g., the rig controller 60).

The valve 200 can be automatically actuated to either open or closed positions based on sensor data received from the instrumented sub 100 by the rig controller 60. The rig controller 60 can process the sensor data and determine a desired state of the valve 200. The rig controller 60 can then control rig equipment (e.g., the top drive 40) to send hydraulic, or electric, or optical signals to the instrumented sub 100 through the rotary interface 300 to actuate the valve 200 to the desired state (e.g., open, closed, partially open, etc.).

Alternatively, or in addition to, the controller in the instrumented sub 100 can determine a desired state of the valve 200 based on the sensor data and cause the valve 200 to be actuated to the desired state either directly or remotely by controlling the external rig equipment through the rotary interface 300.

The valve 200 can include a proximity sensor 280 that can be used to determine the actual rotational position of the valve 200 by detecting the position of one or more of the pistons 250, 254, 260, 264, detecting the rotational position of a drive gear 212, 222, or detecting the rotational orientation of the ball valve 204. The actual valve orientation can be determined by the controller based on the proximity sensor 280 data and communicated to the rig controller 60 for valve status. This information can be used to ensure that the valve is closed before the tubular string 28 is disconnected from the instrumented sub 100 (or the sub 52).

The instrumented sub 100 can improve personnel safety and reliability of the surface equipment by early warning and active flow control response to abnormal variations in pressure, axial and bending loads, drilling characteristics (kicks and blowout detection, torque and hook load reactions, vibration characteristics of a top drive 40, etc.), and by capturing and analyzing stress and cumulative fatigue data encountered by the valve's body and the top drive's quill 42.

The instrumented sub 100 can provide remote valve control and valve state feedback, as well as measurements for hook load, top drive torque, tubular string bending, vibration detection, shock detection, revolutions per minute (RPM), pressures above and below the valve 200, temperatures of the operational fluid and the external environment, top drive ranging, valve state, etc. The instrumented sub 100 can provide a high battery capacity, along with an optional embedded generator 290 for generating power to operate the sub's components or charge the energy storage modules 230. The instrumented sub 100 can provide high sampling rate for sensor data since the controller is contained within the instrumented sub 100 and in close proximity to the sensors.

The generator 290 can utilize the rotational relationship between the rotary portion 350 and the stationary portion 310 of the rotary interface 300 to generator electricity. Since the rotary portion 350 spins relative to the stationary portion 310, the generator can be coupled between the portions 310 and 350 with the stationary portion 310 coupled to a stator of the generator 290 and a rotor coupled to the rotary portion 350. As the rotary portion 350 is rotated, the generator 290 can transform mechanical energy of rotation of the rotary portion 350 into electrical energy. Alternatively, adding permanent magnets to the stationary portion 310 and a winding to the rotary portion 350 can cause electromagnetic fields (EMF) to be created, which can induce current in the winding when the rotary portion 350 rotates. Alternatively, adding permanent magnets to the rotary portion 350 and a winding to the stationary portion 310 can cause electromagnetic fields (EMF) to be created, which can induce current in the winding when the rotary portion 350 rotates. The generated electricity can be used to recharge the energy storage modules 230 or power components of the instrumented sub 100.

The instrumented sub 100 can provide a smart energy storage controller for managing the charge/discharge of the energy storage modules 230. If the optional generator is also included, the smart energy storage controller can be used to control the generation and storage of energy for the instrumented sub 100.

Other types of the power generators could be embedded into the TopView to harvest vibration or mudflow energy. Additionally, the instrumented sub 100 can receive a power line from the top drive 40 that is coupled to the stationary portion 310 of the rotary interface 300 and delivers power to the instrumented sub 100 through the rotary interface 300 via the primary and secondary induction rings 320, 322 or another pair of induction rings (not shown).

Figure 10:
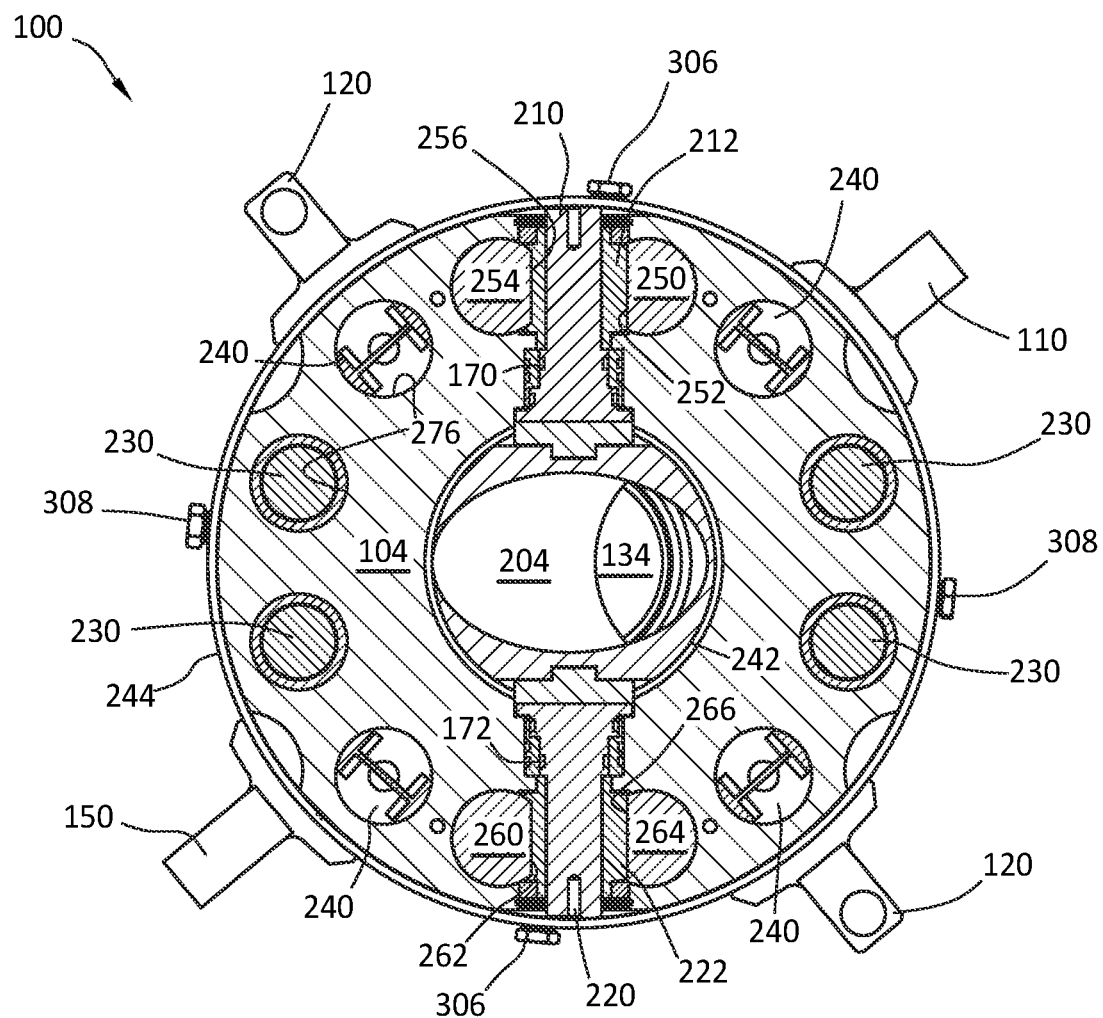
FIG. 10 is a representative partial cross-sectional view 10-10, as indicated in FIG. 9, of the instrumented sub with an integral valve, in accordance with certain embodiments.

FIG. 10 is a representative partial cross-sectional view along line 10-10 of FIG. 9 of the instrumented sub 100 with an integral valve 200, in accordance with certain embodiments. The internal flow passage 134 can be seen through the valve 200 since the valve 200 is partially opened. The ball 204 is coupled to the drive shafts 210, 220 that extend radially from the ball in opposite directions. The drive shaft 210, 220 can include a respective seal 170, 172 that can prevent fluids from the flow passage 134 from escaping the instrumented sub 100 via a cavity through which the drive shaft 210, 220 extends. However, the single seal 170 or 172 does not form a sealed chamber that extends between an inner wall 242 and an outer wall 244. From the seal 170 or 172, the drive shaft 210 or 220, respectively, is not sealed from the external environment, it is not a sealed chamber.

As can be seen, multiple bores 276 can be distributed around the body of the upper portion 104. In this configuration, there are four energy storage modules 230 and four electronics modules 240 installed in the cylindrical bores 276. Also, two pairs of pistons 250, 254, 260, 264 are included in the preferred embodiment, but one pair can also be used instead.

Figure 11:
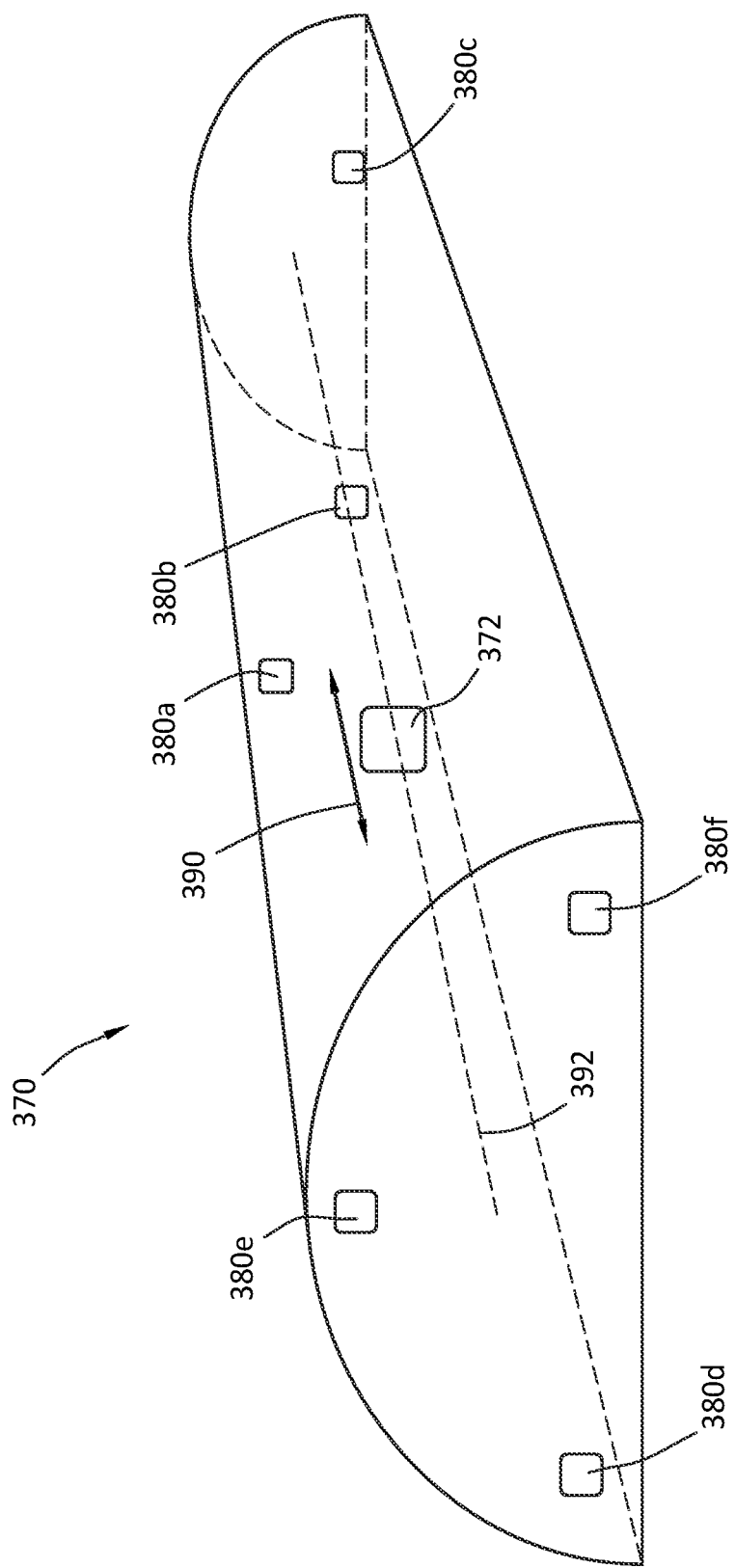
FIG. 11 is a functional diagram of a tracking system for tracking a position of an object along a linear displacement, in accordance with certain embodiments.

FIG. 11 is a functional diagram of a tracking system 370 (e.g., based on ultra-wide band UWB ranging technology) for tracking a position of an object 372 along a linear displacement 392, in accordance with certain embodiments. In this tracking system 370, the object 372 can be displaced (arrows 390) along the linear displacement 392 and its position can be determined by sensing the location of one or more anchors 380*a-f*. A sensing device can be included in the object 372 that senses the location and direction of the anchors 380*a-f*. Based on this directional information, a controller in the object 372 (or remote from the object but receiving the sensor data) can determine the position of the object along the linear displacement 392. This tracking system 370 can be beneficial in the oil and gas industry for determining the vertical location of a top drive 40 during rig operations.

Figure 12:
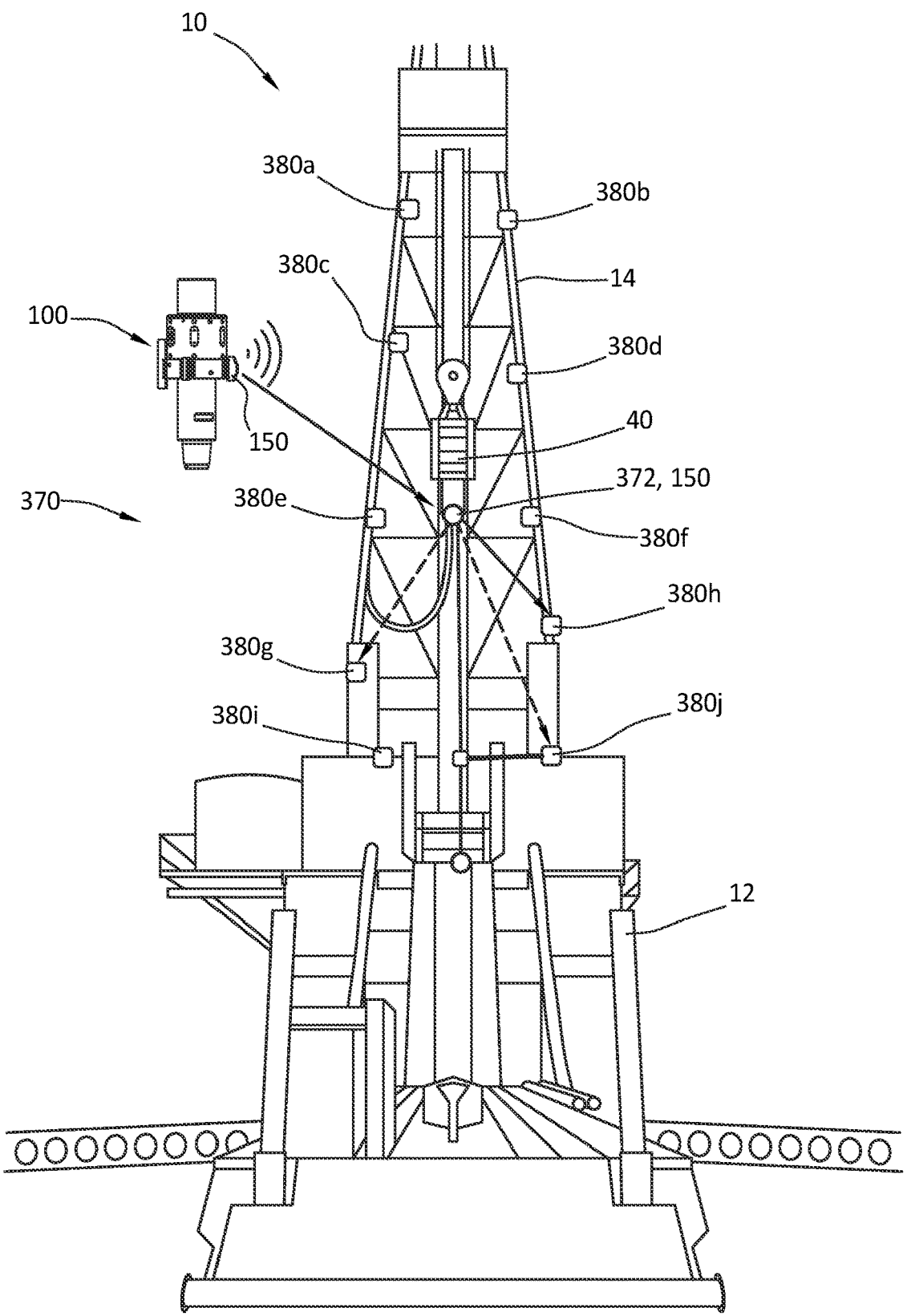
FIG. 12 is a representative tracking system on a rig for tracking a position of a top drive; in accordance with certain embodiments.

FIG. 12 is a representative diagram showing the tracking system 370 being used on a rig 10 for tracking a position of a top drive 40, in accordance with certain embodiments. In this configuration, the object 372 can be a top drive 40 (or more specifically, the wireless interface 150 of the instrumented sub 100) and the tracking system 370 can be used to determine the vertical position of the top drive 40 at any given time during rig operations. The top drive 40 travels vertically up or down along a guide rail during rig operations, and accurate positioning information for the top drive 40 can be very beneficial for rig operations, such as calculating pipe tally.

A pipe tally can be determined during tripping in a tubular string 28 into the wellbore 30 during subterranean operations by adding the vertical movement of the top drive 40 to a pipe tally when the top drive is coupled to the tubular string 28 and lowering a new tubular 38 coupled to the tubular string 28 into the wellbore 30. When the top drive is decoupled from the tubular string 28 and moved vertically upward to provide clearance to receive another tubular 38, the vertical position can be determined to ensure clearance of the top drive 40 to the new tubular 38 being added, but the vertical movement is not used to modify the pipe tally. However, if the tubular string 28 remains coupled to the top drive 40, when the top drive 40 is moved vertically upward, then the vertical distance can be subtracted from the pipe tally. In this way, the instrumented sub 100, with the ranging feature provided by the wireless interface and the plurality of anchors 380*a-j*, can be used to update the pipe tally in real-time to maintain a real-time depth of the tubular string 28 in the wellbore 30 and thus the depth of the drill bit 74.

A pipe tally can also be determined during tripping out a tubular string 28 from the wellbore 30 during subterranean operations by subtracting the vertical movement of the top drive 40 from a pipe tally when the top drive is coupled to the tubular string 28 and raising the tubular string 28 out of the wellbore 30. When the top drive is decoupled from the tubular string 28 and moved vertically downward after a tubular 38 is removed from the tubular string 28, the vertical position can be determined to ensure positioning the top drive 40 (or elevator coupled to the top drive 40) to be able to a stickup of the tubular string 28 at well center, but the vertical movement downward is not factored into the pipe tally. However, if the tubular string 28 remains coupled to the top drive 40, when the top drive 40 is moved vertically downward, then the vertical distance can be added to the pipe tally. In this way, the instrumented sub 100, with the ranging feature provided by the wireless interface and the plurality of anchors, can be used to update the pipe tally in real-time to maintain a real-time depth of the tubular string 28 in the wellbore 30 and thus the depth of the drill bit 74.

Various Embodiments

Embodiment 1. An instrumented sub for supporting subterranean operations, the instrumented sub comprising:
an upper portion containing a valve;
a lower portion;
a flow passage extending through the upper portion and the lower portion, wherein the valve selectively permits or restricts fluid flow through the flow passage; and
a rotary interface coupled to the upper portion, the rotary interface comprising a rotary portion and a stationary portion, wherein the rotary portion is rotationally fixed to the upper portion and rotates with the upper portion when the upper portion is rotated, wherein the stationary portion is rotationally coupled to the rotary portion, and wherein the rotary interface transfers communication signals between the stationary portion and the rotary portion to transmit commands or data to or receive the commands or data from one or more components of the instrumented sub.

Embodiment 2. The instrumented sub of embodiment 1, further comprising:
an anchor configured to engage a grabber system of a top drive, wherein the anchor is rotationally fixed to the stationary portion and is configured to rotationally fix the stationary portion to the grabber system when the anchor is engaged with the grabber system.

Embodiment 3. The instrumented sub of embodiment 1, further comprising one or more bores formed in a body of the upper portion, wherein the one or more bores are parallel to a central axis of the flow passage.

Embodiment 4. The instrumented sub of embodiment 3, wherein the one or more bores are spaced radially away from the flow passage and positioned circumferentially about the flow passage.

Embodiment 5. The instrumented sub of embodiment 3, wherein a module or piston is installed in each of the one or more bores.

Embodiment 6. The instrumented sub of embodiment 5, wherein the module comprises an energy storage device, electronic circuitry, one or more sensors, or a combination thereof.

Embodiment 7. The instrumented sub of embodiment 6, wherein the electronic circuitry comprises one of a processor; a microprocessor; a digital signal processor; a field-programmable gate array; a programmable logic device; a state machine; a neural network; machine learning circuitry; non-transitory memory; one or more magnetometers, accelerometers, gyroscopes, temperature sensors, pressure sensors, or strain gauges; control logic; signal conditioners; power distribution circuitry; and a combination thereof.

Embodiment 8. The instrumented sub of embodiment 6, wherein the energy storage device comprises one or more batteries, one or more capacitors, one or more devices that store electric or hydraulic energy, or a combination thereof.

Embodiment 9. The instrumented sub of embodiment 1, wherein the communication signals comprise electrical signals, hydraulic signals, optical signals, electromechanical signals, or a combination thereof.

Embodiment 10. The instrumented sub of embodiment 1, wherein the communication signals selectively actuate the valve between open and closed positions.

Embodiment 11. The instrumented sub of embodiment 1, wherein the communication signals communicate control between a rig controller and a controller in the instrumented sub.

Embodiment 12. The instrumented sub of embodiment 1, wherein the rotary portion receives power from the stationary portion and transfers the power to one or more components of the instrumented sub or to a wired connection in a pin end of the instrumented sub, wherein the pin end is configured to interface with a wire of a wired tubular string.

Embodiment 13. The instrumented sub of embodiment 1, wherein the instrumented sub transfers the commands or data between the rotary portion and a wireless interface mounted to the stationary portion.

Embodiment 14. The instrumented sub of embodiment 13, wherein the wireless interface receives or transmits the commands or data from or to a rig controller via wireless telemetry.

Embodiment 15. The instrumented sub of embodiment 1, wherein a box end adjacent the upper portion is configured to couple the instrumented sub to a top drive, and wherein a pin end adjacent the lower portion is configured to couple the instrumented sub to a second sub or a tubular string.

Embodiment 16. The instrumented sub of embodiment 1, wherein the upper portion comprises a radially reduced diameter portion that forms an annular groove in a body of the upper portion.

Embodiment 17. The instrumented sub of embodiment 16, wherein one or more strain gauges are positioned in the annular groove, and wherein the one or more strain gauges measure a torsional force acting on one of the upper portion or the lower portion relative to the other one of the upper portion or the lower portion.

Embodiment 18. The instrumented sub of embodiment 16, wherein a first magnet is mounted to the stationary portion at a known azimuthal position relative to a center axis of the instrumented sub, wherein one or more magnetometers are positioned along the annular groove, and wherein a rotational parameter is measured when the one or more magnetometers sense the first magnet.

Embodiment 19. The instrumented sub of embodiment 18, wherein the rotational parameter is revolutions per minute (RPM), an azimuthal orientation of the first magnet relative to the one or more magnetometers, or a combination thereof.

Embodiment 20. The instrumented sub of embodiment 18, wherein a second magnet is mounted to the stationary portion at an azimuthal position that is substantially 180 degrees from the first magnet.

Embodiment 21. The instrumented sub of embodiment 20, wherein a rotational parameter is measured when the one or more magnetometers sense the second magnet.

Embodiment 22. The instrumented sub of embodiment 16, wherein one or more sensors are positioned along the annular groove, and wherein the one or more sensors measures torque applied by a top drive, rotational parameters of a tubular string, sensor data used to determine toolface, vibration signals received from the tubular string, or a combination thereof.

Embodiment 23. The instrumented sub of embodiment 1, further comprising a generator coupled between the rotary portion and the stationary portion, wherein rotational motion between the rotary portion and the stationary portion drives the generator.

Embodiment 24. The instrumented sub of embodiment 23, wherein the generator produces electric energy to power one or more components of the instrumented sub.

Embodiment 25. A system for performing a subterranean operation, the system comprising:
 a top drive coupled to a rig and configured to move vertically relative to the rig; and
 the instrumented sub of any one of embodiments 1-24, wherein the instrumented sub is coupled to the top drive and measures operational parameters during operation of the subterranean operation.

Embodiment 26. The system of embodiment 25, further comprising:
 a plurality of anchors positioned at vertically distributed positions along the rig and spaced away from a path of the top drive as the top drive moves vertically relative to the rig, wherein a wireless interface coupled to the stationary portion of the instrumented sub detects one or more of the plurality of anchors and determines a vertical position of the top drive based on detection of the one or more of the plurality of anchors.

Embodiment 27. A method for performing a subterranean operation, the method comprising:
 coupling an instrumented sub of any one of embodiments 1-24 to a top drive;
 moving the top drive, relative to a rig, along a substantially vertical path;
 positioning a plurality of anchors at vertically distributed locations along the rig and spaced horizontally away from the vertical path of the top drive;
 detecting, via a wireless interface, one or more of the plurality of anchors, wherein the wireless interface is coupled to the stationary portion of the instrumented sub; and
 determining, via a rig controller, a vertical position of the top drive along the vertical path based on the detecting of the one or more of the plurality of anchors.

Embodiment 28. The method of embodiment 27, further comprising:
 tracking the vertical position of the top drive over time; and
 determining a pipe tally based on vertical movement of the top drive.

Embodiment 29. A method for performing a subterranean operation, the method comprising:
 coupling an instrumented sub between a top drive and a tubular string;
 coupling one or more conduits to the instrumented sub via a rotary interface of the instrumented sub;
 transmitting one or more communication signals through the rotary interface, wherein a portion of the rotary interface is configured to rotate relative to the top drive; and
 actuating a valve of the instrumented sub to adjust fluid flow through a flow passage extending through the instrumented sub in response to the one or more communication signals.

Embodiment 30. The method of embodiment 29, further comprising transmitting power through the rotary interface to power one or more components of the instrumented sub.

Embodiment 31. The method of embodiment 29, wherein the communication signals comprise electrical signals, hydraulic signals, optical signals, electromechanical signals, or a combination thereof.

Embodiment 32. The method of embodiment 29, wherein adjusting the fluid flow comprises actuating the valve between open, closed, or partially open positions.

Embodiment 33. The method of embodiment 29, wherein the rotary interface comprises a rotary portion and a stationary portion, wherein the rotary portion is rotationally fixed to a body of the instrumented sub and rotates with the body when the body is rotated, wherein the stationary portion is rotationally coupled to the rotary portion, and wherein a flow passage extends longitudinally through the body.

Embodiment 34. The method of embodiment 33, further comprising:
 coupling a generator between the rotary portion and the stationary portion, such that rotation of the rotary portion relative to the stationary portion drives the generator and generates power, wherein the instrumented sub is configured to utilize the generated power to power one of more components.

Embodiment 35. The method of embodiment 33, further comprising:
 removably installing a module in at least one of one or more bores formed in the body prior to the coupling of the instrumented sub between the top drive and the tubular string; and
 removing the module from the at least one of the one or more bores while the instrumented sub is coupled between the top drive and the tubular string.

Embodiment 36. The method of embodiment 35, wherein the module comprises one of an energy storage device, electronic circuitry, one or more sensors, or a combination thereof.

Embodiment 37. The method of embodiment 33, further comprising:
sensing rig operation parameters via one or more sensors in the instrumented sub; and
transmitting the rig operation parameters to a rig controller via a wireless interface rotationally coupled to the body.

Embodiment 38. A method for performing a subterranean operation, the method comprising:
coupling an instrumented sub between a top drive and a tubular string;
determining one or more operational parameters based on data from one or more sensors of the instrumented sub; and
actuating a mud-saver valve integral to the instrumented sub between open and closed positions based on the one or more operational parameters.

Embodiment 39. The method of embodiment 38, further comprising:
transmitting a state of the mud-saver valve, through a rotary interface of the instrumented sub, to a wireless interface, and to a rig controller via wireless telemetry; and
initiating, via the rig controller, a rig operation based on the state.

Embodiment 40. The method of embodiment 38, wherein the instrumented sub comprises a rotary interface with a rotary portion and a stationary portion.

Embodiment 41. The method of embodiment 40, wherein the rotary portion is rotationally fixed to a body of the instrumented sub and rotates with the body when the body is rotated, wherein the stationary portion is rotationally coupled to the rotary portion, wherein a flow passage extends longitudinally through the body, and wherein the mud-saver valve selectively permits or restricts fluid flow through the flow passage.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. An instrumented sub for supporting subterranean operations, the instrumented sub comprising:
an upper portion containing a valve;
a lower portion;
a flow passage extending through the upper portion and the lower portion, wherein the valve selectively permits or restricts fluid flow through the flow passage; and
a rotary interface coupled to the upper portion, the rotary interface comprising a rotary portion and a stationary portion, wherein the rotary portion is rotationally fixed to the upper portion and rotates with the upper portion when the upper portion is rotated, wherein the stationary portion is rotationally coupled to the rotary portion, and wherein the rotary interface transfers communication signals between the stationary portion and the rotary portion to transmit commands or data to or receive the commands or data from one or more components of the instrumented sub.

2. The instrumented sub of claim 1, further comprising:
an anchor configured to engage a grabber system of a top drive, wherein the anchor is rotationally fixed to the stationary portion and is configured to rotationally fix the stationary portion to the grabber system when the anchor is engaged with the grabber system.

3. The instrumented sub of claim 1, further comprising one or more bores formed in a body of the upper portion, wherein the one or more bores are parallel to a central axis of the flow passage, and wherein the one or more bores are spaced radially away from the flow passage and positioned circumferentially about the flow passage.

4. The instrumented sub of claim 3, wherein a module or piston is installed in each of the one or more bores.

5. The instrumented sub of claim 4, wherein the module comprises an energy storage device, electronic circuitry, one or more sensors, or a combination thereof.

6. The instrumented sub of claim 5, wherein the electronic circuitry comprises one of a processor; a microprocessor; a digital signal processor; a field-programmable gate array; a programmable logic device; a state machine; a neural network; machine learning circuitry; non-transitory memory; one or more magnetometers, accelerometers, gyroscopes, temperature sensors, pressure sensors, or strain gauges; control logic; signal conditioners; power distribution circuitry; and a combination thereof.

7. The instrumented sub of claim 5, wherein the energy storage device comprises one or more batteries, one or more capacitors, one or more devices that store electric or hydraulic energy, or a combination thereof.

8. The instrumented sub of claim 1, wherein the communication signals comprise electrical signals, hydraulic signals, optical signals, electromechanical signals, or a combination thereof.

9. The instrumented sub of claim 1, wherein the communication signals selectively actuate the valve between open and closed positions.

10. The instrumented sub of claim 1, wherein the communication signals communicate control between a rig controller and a controller in the instrumented sub.

11. The instrumented sub of claim 1, wherein the rotary portion receives power from the stationary portion and transfers the power to one or more components of the instrumented sub or to a wired connection in a pin end of the instrumented sub, wherein the pin end is configured to interface with a wire of a wired tubular string.

12. The instrumented sub of claim 1, wherein the instrumented sub transfers the commands or data between the rotary portion and a wireless interface mounted to the stationary portion, and wherein the wireless interface receives or transmits the commands or data from or to a rig controller via wireless telemetry.

13. The instrumented sub of claim 1, wherein a box end adjacent the upper portion is configured to couple the instrumented sub to a top drive, and wherein a pin end adjacent the lower portion is configured to couple the instrumented sub to a second sub or a tubular string.

14. The instrumented sub of claim 1, wherein the upper portion comprises a radially reduced diameter portion that forms an annular groove in a body of the upper portion.

15. The instrumented sub of claim 14, wherein one or more strain gauges are positioned in the annular groove, and wherein the one or more strain gauges measure a torsional force acting on one of the upper portion or the lower portion relative to the other one of the upper portion or the lower portion.

16. The instrumented sub of claim 14, wherein a first magnet is mounted to the stationary portion at a known azimuthal position relative to a center axis of the instrumented sub, wherein one or more magnetometers are positioned along the annular groove, and wherein a rotational parameter is measured when the one or more magnetometers sense the first magnet.

17. The instrumented sub of claim 16, wherein the rotational parameter is revolutions per minute (RPM), an azimuthal orientation of the first magnet relative to the one or more magnetometers, or a combination thereof.

18. The instrumented sub of claim 16, wherein a second magnet is mounted to the stationary portion at an azimuthal position that is substantially 180 degrees from the first magnet.

19. The instrumented sub of claim 14, wherein one or more sensors are positioned along the annular groove, and wherein the one or more sensors measures torque applied by a top drive, rotational parameters of a tubular string, sensor data used to determine toolface, vibration signals received from the tubular string, or a combination thereof.

20. The instrumented sub of claim 1, further comprising a generator coupled between the rotary portion and the stationary portion, wherein rotational motion between the rotary portion and the stationary portion drives the generator.

* * * * *